United States Patent Office 3,115,498  
Patented Dec. 24, 1963

3,115,498  
2-PERFLUOROALKYL-5-ARYL-1,3,4-TRIAZOLE  
AND PREPARATION THEREOF  
David C. Remy, Madison, Wis., assignor to E. I. du Pont de Nemours and Company, Wilmington, Del., a corporation of Delaware  
No Drawing. Filed Jan. 31, 1961, Ser. No. 85,995  
3 Claims. (Cl. 260—308)

This invention relates to novel compounds and more particularly to N-arylmethyleneperfluoroacylamidrazones and 2-perfluoroalkyl-5-aryl-1,3,4-triazoles.

It is an object of the present invention to provide novel fluorocarbon compounds. A further object is to provide new amidrazones and triazoles having fluorinated substituents. It is a further object to provide processes for the preparation of these novel fluorocarbon compounds.

These and other objects of this invention are accomplished by providing N-arylmethyleneperfluoroacylamidrazones having the formula

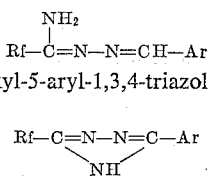

and 2-perfluoroalkyl-5-aryl-1,3,4-triazoles having the formula

Rf—C=N—N=C—Ar  
    \\       /  
      NH wherein Rf is a monovalent perfluoroalkyl radical having at least 3 carbon atoms, with the residual valence being on a carbon atom and Ar is an aromatic hydrocarbon radical of from 6 to 18 carbon atoms which radical may be optionally substituted by alkyl radicals, alkoxy radicals or halogen atoms, with the residual valence of said aromatic hydrocarbon radical being on a carbon atom. For purposes of the present invention, it is preferred that the perfluoroalkyl radical, Rf, contain from about 3 to 13 carbon atoms and that the alkyl and alkoxy substituents on the Ar radical be lower alkyl and lower alkoxy. The halogen substituents on the Ar radical include chlorine, bromine, fluorine and iodine.

The term "perfluoroalkyl radical" as used throughout the specification and claims refers to an alkyl radical wherein all of the hydrogen atoms have been replaced by fluorine atoms. A perfluoroalkyl radical accordingly contains only carbon and fluorine atoms. The carbon atoms therein are joined by carbon-to-carbon single bonds and each fluorine atom therein is joined only to a carbon atom.

Representative examples of N-arylmethylene perfluoroacylamidrazones within the scope of the present invention are N-phenylmethylene heptafluorobutyramidrazone (also called N-benzal heptafluorobutyramidrazone or N-benzylidene heptafluorobutyramidrazone);  
N-(4-methyl phenyl) methylene heptafluorobutyramidrazone;  
N-(4-n-propyl phenyl) methylene heptafluorobutyramidrazone;  
N-(3,4-diethoxy phenyl) methylene heptafluorobutyramidrazone;  
N-β-naphthyl methylene heptafluorobutyramidrazone;  
N-9-anthryl methylene heptafluorobutyramidrazone;  
N-(4-methoxy phenyl) methylene heptafluorobutyramidrazone;  
N-(2-methyl phenyl) methylene perfluorovaleramidrazone;  
N-(3,5-dimethyl phenyl) methylene perfluorovaleramidrazone;  
N-(3-chlorophenyl) methylene perfluorovaleramidrazone;  
N-(3,4,5-trimethoxy phenyl) methylene perfluorovaleramidrazone;  
N-(2-ethyl phenyl) methylene perfluorovaleramidrazone;  
N-(4-biphenylyl) methylene perfluorovaleramidrazone;  
N-(4-chlorophenyl) methylene perfluorocaproamidrazone;  
N-(2-fluorophenyl) methylene perfluorocaproamidrazone;  
N-(2-bromophenyl) methylene perfluorocaproamidrazone;  
N-(α-naphthyl) methylene perfluorocaproamidrazone;  
N-(1-phenanthryl) methylene perfluorocaproamidrazone;  
N-(2,3,6-trimethyl phenyl) methylene perfluorocaprylamidrazone;  
N-(2,4,6-triisopropyl phenyl) methylene perfluorocaprylamidrazone;  
N-(2-iodophenyl) methylene perfluorocapramidrazone;  
N-(2-bromo-6-chlorophenyl) methylene perfluorocapramidrazone;  
N-(4-n-butyl phenyl) methylene perfluorolauramidrazone; and  
N-(3-pyrenyl) methylene perfluoromyristamidrazone.

These N-arylmethylene perfluoroacylamidrazones are prepared by reacting a perfluoroacylamidrazone with an aromatic aldehyde; generally a slight molar excess (about a 20 to 30% excess) of the aromatic aldehyde is preferred. A trace of acid catalyst is also preferred but may be omitted. This reaction may be illustrated by the following equation:

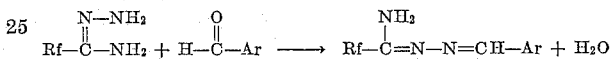

wherein Rf and Ar are as defined above. In a representative procedure the aldehyde is added incrementally at atmospheric pressure to the perfluoroacylamidrazone at about 20 to 30° C. in absolute ethanol, a trace of sulfuric acid is introduced, and the mixture refluxed; if desired, the water formed can be distilled off as an azeotropic mixture. The progress of the reaction can be followed by measuring the amount of water obtained. When the reaction is finished, conventional procedures are used to isolate the product; phases are separated when the product is an immiscible liquid; the product is collected by filtration when it is an insoluble solid; a large volume of water is added to cause phase separation when the product is soluble. The product is purified by dissolving it in a water-immiscible organic solvent (e.g. diethyl ether) and washing the solution, in turn, with saturated aqueous sodium bisulfite, 20% aqueous potassium hydroxide, and water; removal of the solvent yields the N-arylmethylene perfluoroacylamidrazone.

When preparing these compounds, alcohols boiling higher than ethanol can be used as solvents. Sub or super atmospheric pressures may be selected. The preferred temperature for convenient operation ranges from about 15° C. to 90° C. At temperatures above 90° C., there is a possibility of undesired side-reactions.

The perfluoroacylamidrazones themselves are made by adding the corresponding nitriles in the conventional manner to a molar excess (about 150 to 400%) of hydrazine hydrate which is cooled by Dry Ice and serves as the solvent. The temperature is allowed to rise to at least 20 to 30° C. afterward. Solid amidrazones can be collected by filtration. If the product is an oil, water is added and the mixture is extracted with a water-immiscible solvent such as diethyl ether; evaporation of the solvent from the extract gives the amidrazone.

The 2-perfluoroalkyl-5-aryl-1,3,4-triazoles are prepared by oxidatively ring-closing the above described N-arylmethylene perfluoroacylamidrazones. In a representative procedure the amidrazone is treated at about 20 to 30° C. at atmospheric pressure in glacial acetic acid with a molar excess (about 20 to 30%) of iodine (based on the number of $NH_2$ groups). The product is isolated by adding solid sodium bisulfite to destroy the excess iodine, introducing solid sodium hydroxide to neutralize most of the acetic acid, pouring the mixture into a large volume of water, extracting the resulting mixture with a water-immiscible solvent such as diethyl ether, separating the organic phase and washing it, in turn, with aqueous sodium bicarbonate and water, drying the organic phase and removing the solvent.

Representative examples of 2-perfluoroalkyl-5-aryl-1,3,4-triazoles within the scope of the present invention are:

2-(heptafluoropropyl)-5-phenyl-1,3,4-triazole;
2-(heptafluoropropyl)-5-(4'-methylphenyl)-1,3,4-triazole;
2-(heptafluoropropyl)-5-(4'-n-propylphenyl)-1,3,4-triazole;
2-(heptafluoropropyl)-5-(3',4'-diethoxyphenyl)-1,3,4-triazole;
2-(heptafluoropropyl)5-($\beta$-naphthyl)-1,3,4-triazole;
2-(heptafluoropropyl)-5-(9'-anthryl)-1,3,4-triazole;
2-(heptafluoropropyl)-5-(4'-methoxyphenyl)-1,3,4-triazole;
2-(n-perfluorobutyl)-5-(2'-methylphenyl)-1,3,4-triazole;
2-(n-perfluorobutyl)-5-(3',5'-dimethylphenyl)-1,3,4-triazole;
2-(n-perfluorobutyl)-5-(3'-chlorophenyl)-1,3,4-triazole;
2-(n-perfluorobutyl)-5-(3',4',5'-trimethoxyphenyl)-1,3,4-triazole;
2-(n-perfluorobutyl)-5-(2'-ethylphenyl)-1,3,4-triazole;
2-(n-perfluorobutyl)-5-(4'-biphenylyl)-1,3,4-triazole;
2-(n-perfluoropentyl)-5-(4'-chlorophenyl)-1,3,4-triazole;
2-(n-perfluoropentyl)-5-(2'-fluorophenyl)1-3,4-triazole;
2-(n-perfluoropentyl)-5-(2'-bromophenyl)-1,3,4-triazole;
2-(n-perfluoropentyl)-5-($\alpha$-naphthyl)-1,3,4-triazole;
2-(n-perfluoropentyl)-5-(1'-phenanthryl)-1,3,4-triazole;
2-(n-perfluoroheptyl)-5-(2',3',6'-trimethylphenyl)-1,3,4-triazole;
2-(n-perfluoroheptyl)-5-(2',4',6'-triisopropylphenyl)-1,3,4-triazole;
2-(n-perfluorononyl)-5-(2'-iodophenyl)-1,3,4-triazole;
2-(n-perfluorononyl)-5-(2'-bromo-6'-chlorophenyl)-1,3,4-triazole;
2-(n-perfluoroundecyl)-5-(4'-n-butylphenyl)-1,3,4-triazole; and
2-(n-perfluorotridecyl)-5-(3'-pyrenyl)-1,3,4-triazole.

The fluorinated organic compounds of the present invention are useful in that they may be employed as heat transfer media. When molten they may be pumped through jacketed reactors, condensers, heat exchangers and pipes made of steel, stainless steel, glass, and other conventional materials for confining heat transfer media. Thus they can be used in equipment for molding plastic and rubber goods, processing paints, varnishes, and food products, fractionating petroleum, heating chemical process equipment, heating rotating drums and coating coils, and evaporating high-boiling solvents.

The following examples will better illustrate the nature of the present invention; however, the invention is not intended to be limited to these examples. Parts are by weight unless otherwise indicated.

EXAMPLE 1

(A) *Esterification of Heptafluorobutyric Acid*

Heptafluorobutyric acid (150 grams) was dissolved in absolute ethanol (250 milliliters). After concentrated hydrochloric acid (1 milliliter) had been added, the solution was refluxed for 4 hours. The condenser was removed and replaced by a distilling head. Ethyl heptafluorobutyrate and ethanol distilled from the reaction mixture and were collected. When a residue of 25 to 30 milliliters was left, absolute ethanol (50 milliliters) was added to the pot and distillation was continued to dryness. The temperature did not exceed 81° C. Water (one liter) containing ammonium chloride (10 grams) was added to the distillate. The ethyl heptafluorobutyrate which separated as a colorless oil, was separated and the aqueous phase was extracted with ether (100 milliliters). The oil and ether extract were combined and dried over anhydrous magnesium sulfate.

(B) *Preparation of Heptafluorobutyroamide*

The dried ester solution prepared in A above was introduced into a 4-neck one-liter round-bottom flask equipped with a stirrer, gas inlet tube, thermometer, and condenser. Dry ether (300 milliliters), which had been used to rinse the magnesium sulfate, was added and the solution was cooled to −10° C. Over a 5-hour period a slow stream of ammonia was bubbled through the stirred solution while the temperature was kept below 11° C. Then, while stirred, the solution was allowed to warm to room temperature. After the ether, ethanol, and ammonia had been distilled off, heptafluorobutyroamide (125.2 grams, 84% yield based on heptafluorobutyric acid) was obtained as a solid melting at 103.3–105.1° C.

(C) *Dehydration of Heptafluorobutyroamide to Heptafluorobutyronitrile*

Heptafluorobutyroamide (42 grams, 0.197 mole) was mixed with phosphorous pentoxide (56.8 grams, 0.4 mole) in a round-bottom flask equipped with a condenser containing a plug of glass wool in the joint at the base. This condenser was connected to two Dry Ice traps in series. The mixture was then heated until gas evolution ceased; the heptafluorobutyronitrile condensed in the first Dry Ice trap.

(D) *Preparation of Heptafluorobutyramidrazone*

Hydrazine hydrate (30 grams, 0.535 mole) was cooled in a round-bottom flask seated in a Dry Ice acetone bath. The heptafluorobutyronitrile made above (38.4 grams, 0.197 mole maximum) was added and the slurry obtained was stirred. The cooling bath was removed and the mixture was allowed to warm to room temperature while stirred. After 2 hours, water (200 milliliters) was added and the solid which precipitated was extracted with three 100-milliliter portions of ether. About 5 grams of ammonium chloride was added to the aqueous phase to help prevent emulsification. Concentration of the combined ether phases (dried over magnesium sulfate) gave heptafluorobutyramidrazone (37.6 grams, 84% yield based on heptafluorobutyroamide). When recrystallized from benzene this compound gave white needles melting at 71.5–72.5° C.

(E) *Reaction of Heptafluorobutyramidrazone and Benzaldehyde to Form N-phenylmethylene Heptafluorobutyramidrazone*

A solution of 20.0 grams (0.088 mole) of heptafluorobutyramidrazone in 100 milliliters of absolute ethanol was placed at about 25° C. in a round-bottom flask equipped with a magnetic stirrer, dropping funnel, and water-cooled condenser. Agitation was begun. Then 11.2 grams (0.105 mole) of benzaldehyde was added slowly at atmospheric pressure over a 30-minute period; the reaction was mildly exothermic. After 5 drops of concentrated sulfuric acid had been added, external heat was supplied and the solution was refluxed for one hour. The mixture was cooled and 100 milliliters of water was added. The water-insoluble oil was separated and taken up in 100 milliliters of ether. This ether solution was washed, in turn, with two 100-milliliter portions of saturated aqueous sodium bisulfite solution, 100 milliliters of 20% aqueous potassium hydroxide solution, 100 milliliters of water, and then dried over anhydrous magnesium sulfate.

Evaporation of the ether left 24.7 grams (89% yield) of N-phenylmethylene heptafluorobutyramidrazone which was purified by evaporative distillation at 100° C. (0.1 mm.) to give long needles having an "off-white" color, and melting at 51–52° C. An infrared spectrum ("Nujol" mull) showed absorption bands at 2.85, 2.95, and 6.17 microns. Ultraviolet absorption: Lambda max. 95% ethanol: 296 millimicrons (log ε: 4.30) and 220 millimicrons (log ε: 4.17).

*Analysis.*—Calcd. for $C_{11}H_8F_7N_3$: C, 41.91; H, 2.56; N, 13.33; F, 42.20. Found: C, 41.8, 42.1; H, 2.4, 2.2; N, 13.1, 13.1; F, 41.8, 41.8.

EXAMPLE 2

*Cyclization of N-Phenylmethylene Heptafluorobutyramidrazone to 2-(Heptafluoropropyl)-5-Phenyl-1,3,4-Triazole*

A solution of 7.18 grams (0.023 mole) of N-phenylmethylene heptafluorobutyramidrazone prepared by the procedure of Example 1 and 7.62 grams (0.03 mole) of iodine (in 120 milliliters of glacial acetic acid) were stirred at atmospheric pressure for 15 hours at about 25° C. and then for 2.5 hours under reflux. Solid sodium bisulfite was added to consume excess iodine, and solid sodium hydroxide was added to neutralize most of the acetic acid. The mixture was then poured into one liter of water and extracted with six 50-milliliter portions of ether. The combined ether extracts were washed, in turn, with aqueous sodium bicarbonate and water, and dried over an anhydrous magnesium sulfate. Removal of the drying agent and ether left an oil that readily crystallized on cooling to give 3.59 grams (51% yield) of 2 - (heptafluoropropyl)-5-phenyl-1,3,4-triazole as white flakes. The compound after ready recrystallization from n-hexane, melted at 115.5–116.5° C. Its infrared spectrum ("Nujol" mull) showed bands at 6.15 and 6.36 microns. The ultraviolet absorption spectrum of a solution in 95% ethanol exhibited a maximum at 246 millimicrons (log ε=4.21). Neutralization equivalent (30/70 water/ethanol). Calcd: 313.2. Found: 315, 316.

*Analysis.*—Calcd. for $C_{11}H_6F_7N_3$: C, 42.18; H, 1.93; F, 42.47; N, 13.42. Found: C, 42.2, 41.9; H, 1.8, 1.7; F, 42.3, 42.3; N, 12.9, 12.9.

As many widely different embodiments of this invention may be made without departing from the spirit and scope thereof, it is to be understood that this invention is not limited to the specific embodiments thereof except as defined in the appended claims.

What is claimed is:
1. A fluorinated organic compound having the formula

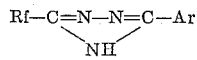

wherein Rf is a monovalent perfluoroalkyl radical having from 3 to 13 carbon atoms and Ar is selected from the group consisting of a monovalent 6 to 18 carbon atom aromatic hydrocarbon group, a monovalent alkyl substituted 6 to 18 carbon atom aromatic hydrocarbon group, a monovalent alkoxy substituted 6 to 18 carbon atom aromatic hydrocarbon group and a monovalent halogen substituted 6 to 18 carbon atom aromatic hydrocarbon group.

2. A process for preparing a 2-perfluoroalkyl-5-aryl-1,3,4-triazole of the formula

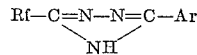

wherein Rf is a monovalent perfluoroalkyl radical having from 3 to 13 carbon atoms and Ar is selected from the group consisting of a monovalent 6 to 18 carbon atom aromatic hydrocarbon group, a monovalent alkyl substituted 6 to 18 carbon atom aromatic hydrocarbon group, a monovalent alkoxy substituted 6 to 18 carbon atom aromatic hydrocarbon group and a monovalent halogen substituted 6 to 18 carbon atom aromatic hydrocarbon group, which comprises oxidatively ring closing an N-arylmethylene perfluoroacylamidrazone by treating said amidrazone with a molar excess of iodine and isolating the triazole thereby obtained.

3. 2-(heptafluoropropyl)-5-phenyl-1,3,4-triazole.

References Cited in the file of this patent

UNITED STATES PATENTS

| | | |
|---|---|---|
| 2,800,486 | Grundmann et al. | July 23, 1957 |
| 2,884,424 | Klingsberg | Apr. 28, 1959 |
| 2,945,884 | Omietanski | July 19, 1960 |
| 2,966,517 | Hauptschein | Dec. 27, 1960 |